US006489387B2

(12) United States Patent
Mallya et al.

(10) Patent No.: US 6,489,387 B2
(45) Date of Patent: *Dec. 3, 2002

(54) WATER WHITENING-RESISTANT PRESSURE-SENSITIVE ADHESIVES

(75) Inventors: Prakash Mallya, Pasadena; Xing-Ya Li, San Gabriel, both of CA (US); Colin C. Smith, State College, PA (US); George Dilts, Cuyahoga Falls, OH (US); Kregg D. Albrecht, Allen, TX (US); Joseph T. Tenhagen, Shaker Heights; Robert D. Petrasko, Concord, both of OH (US)

(73) Assignee: Avery Dennison Corporation, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,490

(22) Filed: Mar. 28, 1997

(65) Prior Publication Data

US 2001/0003765 A1 Jun. 14, 2001

Related U.S. Application Data

(63) Continuation-in-part of application No. 08/534,289, filed on Sep. 29, 1995, now abandoned, and a continuation-in-part of application No. 08/536,153, filed on Sep. 29, 1995, now abandoned, and a continuation-in-part of application No. 08/537,307, filed on Sep. 29, 1995, now abandoned.

(51) Int. Cl.$^7$ .................................................. C08K 5/04
(52) U.S. Cl. ..................... 524/394; 524/417; 524/423; 524/745; 524/747; 524/748; 524/757; 524/832; 524/833; 526/317.1; 526/318.4
(58) Field of Search ................................ 524/710, 742, 524/745, 747, 832, 833, 757, 417, 423, 748, 394; 526/317.1, 318.4

(56) References Cited

U.S. PATENT DOCUMENTS

| | | | |
|---|---|---|---|
| 3,740,366 A | 6/1973 | Sanderson et al. ..... 260/29.6 M |
| 4,397,984 A | 8/1983 | Wendel et al. ............... 524/814 |
| 4,409,355 A | 10/1983 | Heimberg ................... 524/458 |
| 4,588,762 A | 5/1986 | Mruk et al. ................... 524/45 |
| 4,599,378 A | 7/1986 | Hausman et al. ............ 524/554 |
| 4,713,412 A | 12/1987 | Czerepinski et al. ........ 524/833 |
| 4,937,282 A | 6/1990 | Pfoehler et al. ............. 524/820 |
| 4,983,656 A | 1/1991 | Ito et al. ...................... 524/109 |
| 4,994,538 A | 2/1991 | Lee ............................... 526/279 |
| 5,008,329 A | 4/1991 | Abe et al. .................... 524/798 |
| 5,164,444 A | 11/1992 | Bernard ....................... 524/833 |
| 5,183,459 A | 2/1993 | Bernard ......................... 602/52 |
| 5,202,375 A | 4/1993 | Biale ............................ 524/562 |
| 5,240,989 A | 8/1993 | Bernard et al. .............. 524/560 |
| 5,278,227 A | 1/1994 | Bernard ....................... 524/817 |
| 5,286,843 A | 2/1994 | Wood .......................... 528/482 |
| 5,306,558 A | 4/1994 | Takahashi et al. ........... 428/331 |
| 5,374,698 A | 12/1994 | Young et al. ................ 526/264 |
| 5,380,779 A | 1/1995 | D'Haese ...................... 524/272 |
| 5,405,693 A | 4/1995 | Dittrich et al. .............. 428/355 |
| 5,420,195 A | 5/1995 | Mayer et al. ................. 524/556 |
| 5,516,865 A * | 5/1996 | Urquiola .................... 526/329.7 |
| 5,532,300 A | 7/1996 | Koubek et al. ................ 524/47 |
| 5,550,181 A | 8/1996 | Scholz ......................... 524/460 |
| 5,670,557 A * | 9/1997 | Dietz et al. .................. 522/184 |

FOREIGN PATENT DOCUMENTS

EP        0554832 A1    8/1993

OTHER PUBLICATIONS

H. Warson, "The Applications of Synthetic Resin Emulsions", Ernest Benn Ltd., London 1972.

\* cited by examiner

*Primary Examiner*—Judy M. Reddick
(74) *Attorney, Agent, or Firm*—Christie, Parker & Hale, LLP

(57) ABSTRACT

Acrylic emulsion PSA polymers which when cast as a film resist water whitening by hot or ambient temperature water are provided, and are formed by copolymerizing a monomer mixture comprising at least one alkyl acrylate ester of an alcohol containing at least four carbon atoms, at least one polar comonomer and at least one partially water soluble comonomer present in an amount of at least about 7% by weight of the monomers. Polymerization is carried out in the presence of at least one nonionic surfactant containing at least about 8 moles of ethylene oxide per mole nonionic surfactant and at least one anionic surfactant containing up to about 10 moles ethylene oxide per mole anionic surfactant. There is added to the product of polymerization at least one base to produce an emulsion having a pH greater than 7 and containing particles having a mean "volume-average" particle diameter of up to about 210 nm as determined by laser light scattering. An electrolyte is post-polymerization added to stabilize opacity of the adhesive films cast from the emulsion. Applications include autoclavable labels, wet-stick container labels, fleet marking labels and battery labels.

33 Claims, No Drawings

WATER WHITENING-RESISTANT PRESSURE-SENSITIVE ADHESIVES

CROSS-REFERENCE TO RELATED APPLICATION

This application is a continuation-in-part of application Ser. Nos. 08/534,289; 08/536,153 and 08/537,307, each filed Sep. 29, 1995, each incorporated herein by reference and each now abandoned.

FIELD OF THE INVENTION

The invention pertains to acrylic emulsion pressure-sensitive adhesives which when coated and dried as a film are clear and which resist whitening by the action of hot and ambient temperature water.

BACKGROUND OF THE INVENTION

A high degree of resistance to water whitening, especially hot water, by pressure-sensitive adhesives (PSAs) is required for some label applications. For example, bottles labeled with clear film PSA labels can be subjected to pasteurization conditions where the label is expected to remain clear through the process. Historically, solvent based adhesives have been used for such demanding applications. Environmental considerations, however, favor elimination of solvents. This and higher coating speeds attainable with emulsion PSAs, favor their use in place of solvent based PSAs.

Emulsion based PSA polymers are made in the presence of surfactants and other water soluble electrolytes such as initiators. In addition, comonomers such as unsaturated carboxylic acids are employed to impart or enhance adhesive properties and tend to be present at the latex-particle interface and remain there during film formation. Films cast from such emulsions are sensitive to water and become cloudy simply when a drop of water is placed on the film. Water whitening is almost always assured when the water is hot, e.g., the temperature of the water is 70° C. or higher.

The water resistance of acrylic emulsion polymer films has long been addressed in the art particularly with respect to paint films. The art has observed that the presence of water soluble electrolytes, surfactants and polyelectrolytes such as sodium polymethacrylate cause or enhance water sensitivity ("The Applications of Synthetic Resin Emulsions", H. Warson, Ernest Benn Ltd., London, 1972, incorporated herein by reference). It is also well known that surfactants are migratory species that with time move towards and bloom to the surface of films also rendering them water sensitive.

The art has taught that the use of low levels of surfactant, a reduction or elimination in soluble electrolytes and crosslinking between the emulsion particles can all serve to improve or impart water resistance.

U.S. Pat. No. 5,202,375 to Biale, incorporated herein by reference, teaches for this purpose a polymer emulsion that is synthesized with less than about 1% by weight surfactant, has a high surface tension (i.e., greater than 45 dynes/cm) and is made in the presence of high levels of a crosslinking agent. Although the use of such emulsion polymers as PSAs is contemplated, no useful PSA properties are reported. Moreover, with such high levels of crosslinking and low levels of surfactant, poor PSA properties would be expected in addition to significant stability problems during polymerization. The contemplated use is as a water resistant edge sealer for composite boards and plywood. Low swelling of the films by water after long term drying is used to demonstrate water resistance.

European Patent Publication 554,832 to Lu et al., incorporated herein by reference, teaches high solids, moisture resistant PSA emulsion polymers. The emulsion polymer is synthesized in the presence of copolymerizable ionic surfactant and in the presence of a hydrophobic polymeric tackifier with a number average molecular weight ranging from 400 to about 50,000.

There is no mention of water whitening of the PSA film in the '375 and '832 patent specifications.

U.S. Pat. No. 4,994,538 to Lee, et al, incorporated herein by reference, teaches a silicone acrylate PSA copolymer having good water whitening resistance synthesized in the presence of an anionic surfactant. Methyl acrylate and vinyl acetate are optionally present.

U.S. Pat. No. 5,286,843 to Wood, incorporated herein by reference, teaches a process for improving the water whitening resistance of a PSA by use of ion exchange to remove water soluble ions. The deionized latex is claimed to provide superior resistance to water whitening.

SUMMARY OF THE INVENTION

It has now been found that water whitening can be eliminated or significantly reduced in clear or transparent acrylic emulsion PSA polymer laminate constructions where the PSA polymer is based on alkyl acrylates by including in the monomer charge at least one partially water soluble comonomer and at least one polar comonomer and forming the copolymers in the presence of a nonionic surfactant containing at least about 8 moles (mols) ethylene oxide per mole (mol) and an ionic surfactant containing less than about 10 mols ethylene oxide per mol preferably in which the weight ratio of nonionic to anionic surfactant is at least one-to-one (at least 1:1), and in which the formed emulsion is neutralized with a base to a pH above 7. Polymerization is preferably under conditions which form emulsions having mean "volume-average" particle diameters ("Psize") of up to about 210 nm.

The adhesive laminate products formed preferably have an opacity less than about 5%, and more preferably less than about 2.5%, as measured using the boiling water resistance test as described herein. Opacity is measured on a laminate of a layer of the PSA exposed to the action of boiling water for 10 minutes (10 min.) or ambient temperature water for 24 hours (24 hr.) while on a biaxially oriented polypropylene film stock and then laminated to a 2 mil polyester film after exposure. Opacity is measured using a spectrocolorimeter.

Independent of the opacity characteristics of the adhesive film, opacity can be stabilized against change with time by the post-polymerization addition to the formed emulsion copolymer of an inorganic electrolyte.

The PSAs of the present invention may be employed as adhesives which as part of a label construction have a "no label look". The "no label look" is a printed label which, on application to a container, substrate or the like, gives the appearance of direct printing on the container, substrate or the like. To this end, the adhesive constructions remain clear despite the action of moisture under pasteurizing condition.

It has been further found that the tolerance of the coated and dried adhesive film and/or PSA laminate constructions for water surprisingly enables their use under autoclave conditions in that these materials will either remain clear or quickly return to a clear state after autoclaving where solvent based adhesives do not. This makes the adhesives particularly useful for pharmaceutical and medical applications.

The adhesives of the present invention have been further established to have excellent mandrel performance which further enhances their use as adhesives for labels attached to curved surfaces such as bottles and vials used in pharmaceutical and medical applications as well as battery label applications where the adhesive is required to adhere a label to the cylindrical case of a battery. Such applications are also enhanced by established resistance and stability of the adhesives under conditions of high temperature, high humidity and thermal shock.

The ability to absorb moisture without turning white further makes the adhesives particularly attractive to labeling of bottles having wet surfaces, where the wet surface on the bottle is formed by condensation of water on the bottle's outer surface. Such applications include the labeling of bottles having a low surface energy fatty acid or wax coating to prevent scratching of bottles in route to a labeling station.

Another unique application for the adhesives of the present invention is as adhesives for fleet marking films where the coated and dried adhesive films not only provide resistance to water whitening during label application and in use, but also enable the constructions to conform to rivets and corrugated aluminum sidings and to retain that conformity over time.

DETAILED DESCRIPTION

There are provided, in accordance with an embodiment of the instant invention, acrylic emulsion PSA polymer compositions which, when coated and dried as a film, are substantially unaffected by the action of hot and ambient temperature water.

In addition to providing a no label look to transparent and clear face stocks where the resistance of the adhesives to whitening of water makes the adhesives uniquely useful for label applications, resistance to the action of steam under autoclaving conditions is also a requirement. The adhesives also have "wet stick" adhesive properties, and excellent mandrel performance for vial, bottle and battery label applications. The adhesives are also useful in fleet marketing applications where the adhesive must have good water whitening resistance and the ability to enable the face stock to conform to the contours or rivets and the like, and to retain such adopted shape without tenting.

The acrylic emulsion PSA polymers are comprised of at least one acrylate ester of an alcohol containing at least four carbon atoms, at least one partially water soluble comonomer and at least one polar comonomer. They are formed in the presence of a mixture of nonionic and anionic surfactants preferably provided in a weight ratio of at least 1.5:1 to form emuslions have a Psize of up to about 210 nm, preferably of up to about 165 nm, as measured by laser light scattering, preferably using a Nicomp Instrument spectrometer [Model HN 5-90 equipped with an autocorrelator Model TC-100].

Butylacrylate, 2-ethylhexyl acrylate and mixtures thereof are the preferred alkyl acrylates. Methyl acrylate, methyl methacrylate and mixtures thereof are the preferred partially water soluble comonomers. Acrylic acid is the preferred polar comonomer and is most preferably employed in admixture with another carboxylic acid, preferably methacrylic acid. The formed latex is adjusted to a pH of at least 7. The preferred pH is from about 7.2 to about 9, more preferably from about 7.5 to about 8.

Post-polymerization addition of a water soluble inorganic electrolyte stabilizes opacity of films formed from the emulsion and is applicable to copolymers prepared using other acrylic monomer combination and surfactant systems.

Films cast from such an emulsion when dried exhibit outstanding boiling water and autoclave resistance as demonstrated by low opacity numbers, and in addition, function as wet stick adhesives.

As used herein, polymer particles means particles of a polymer comprising an inner layer and an outer layer surrounding the inner layer. "Interstitial space" as used herein means the space between particles. The inner layer is formed of monomers of low water solubility and the outer layer is formed of monomers of high water solubility.

It is believed in the art that the emulsion particles, on drying, form a film wherein the surfactant and other water soluble species, such as electrolytes, remain in the interstitial space between the particles. The interstitial space provides channels or pathways for the water molecules to diffuse into the polymer film. When water diffuses into the film, the refractive index between the polymer particles and the interstitial space becomes significantly different, leading to light scattering and coloration of the film. This is believed to cause the phenomenon known as "water whitening."

It was our initial intent to minimize the presence of water sensitive species and to compatibilize the water sensitive species present with the rest of the polymer and thereby prevent the formation of channels for diffusion of water into the polymer film. "Water sensitive" species include inorganic species such as potassium persulfate and the like and organic species such as surfactants and the like.

Boiling Water Resistance Test

A boiling water resistance test was developed to simulate the effect of pasteurization and as a standard method to determine candidate adhesive polymer opacity. Opacity is the ratio of the reflectance of a sample backed with a white background to that of the sample backed with a black background, multiplied by one hundred, and reported as percent opacity. In the test, a PSA is coated to a level of 20–22 g/m (20–22 g/m$^2$) on a clear 2 mil biaxially oriented polypropylene (BOPP) (Label-Lyte™ 434, Mobil Corp) face stock or backing, dried at 200° F. in an oven for 10 min., is cooled, and after cooling, the film face stock or backing is immersed in a beaker of boiling water (95+° C.) for 10 min. The PSA coated face stock is then immediately laminated to a clear 2 mil polyester (Mylar™) film with a plastic squeegee and the opacity of the resultant laminate determined using a spectrocolorimeter (Hunter Lab ColorQuest 45/0). Percentage opacity is used as a measure for boiling water resistance. The lower the number, the greater the boiling water resistance. A laminate of a 2 mil BOPP with an optically clear adhesive to a 2 mil Mylar not subjected to the action of boiling water gave opacities of around 0.4–0.6%. This is the lowest number expected for such an adhesive laminate. An opacity up to about 2.5% was regarded as good. An opacity above 5.0% was regarded as poor for applications requiring a non-water whitening PSA.

Room Temperature Water Resistance Test

A room temperature water (ambient) resistance test was also developed. First, the opacity of the 2 mil BOPP film-adhesive layer-1.5 mil polyester release liner was determined. The polyester liner was removed, and the liner-free PSA coated BOPP face stock immersed in deionized ambient temperature water for 60 min., removed, and re-laminated to the clear 1.5 mil release liner (Hostaphan™ ZSLK, Hoechst Diafoil) and the opacity was remeasured. The difference in percentage opacity before and after immersion was noted. With the good water resistant adhesives, a very small increase in opacity was seen with little or no visual differences before and after immersion in water.

Without being bound by theory, emulsion particles formed in accordance with this invention are envisioned to have "an onion skin" type structure with the outer layer being more polar than the inner layer and predominantly the result of the copolymerization of an alkyl acrylate with the partially water soluble comonomer and the polar comonomer. The water soluble comonomer is believed to copolymerize in the aqueous phase before being captured by the growing polymer particles.

On neutralization with a base, the outer layer expands to form a hydrophilic zone adjacent to and surrounding the particle inner layer in which hydrophilic species including nonionic and anionic surfactants dissolve or compatibilize. When the level of the water soluble comonomer is too low, the hydrophilic zone is small resulting in exclusion of the hydrophilic species leading to poor resistance to water whitening.

The pH of the latex was found to be critical to obtaining good opacity and therefore resistance to water whitening. We had expected to obtain high water resistance by maintaining the emulsions at a low pH since carboxyl groups would be less ionized. We unexpectedly found, by contrast, that pH had to be above 7, preferably at least about 7.2, to about 9 or more, preferably from about 7.5 to about 8. The bases which may be used for neutralization include weak bases such as ammonia; strong bases, such as sodium hydroxide; organic amines and the like. The presently preferred and most effective base is ammonium hydroxide.

High water resistance is believed to be induced by the increased polarity and size of the hydrophilic layer outside the emulsion particle in which the hydrophilic species can be compatibilized.

The surfactant systems employed during polymerization must be compatible with the whole emulsion polymer, i.e., the predominantly hydrophobic alkyl acrylate inner layer and the hydrophilic copolymer outer layer surrounding the inner layer, and thereby determining water whitening resistance of the coated film product. The surfactant(s) employed during polymerization are also important in stabilizing the particles during polymerization and in storage.

We have found that with anionic surfactants, the level of ethoxylation has to be about 10 moles per mole surfactant or less, preferably 4 moles (ethylene oxide units per molecule) or less for good water whitening resistance. When the average moles of ethylene oxide is too high, opacities tend to be high. It was also observed that even when good, the opacities are not reproducible when an anionic surfactant was the only surfactant. That is, repeated film draw downs from the same emulsion gave desirably low opacities at times and undesirably high opacities at other times.

Other anionic surfactants with higher levels of ethylene oxide (moles per mole) may be used to stabilize the emulsion particles during polymerization or other reasons but do not impart resistance to water whitening.

Functional anionic surfactants include lauryl ether sulfates such as Disponil™ FES-32, Disponil™ FES-993 made by Henkel; salts of sulfated nonyl and octyl phenoxy poly (ethyleneoxy) ethanols such as Aerosol™ NPES-458, Aerosol™ NPES-930 made by Cytek Industries; sulfosuccinates such as Aerosol™ OT-75, Aerosol™ A-501 made by Cytek Industries; aromatic phosphate ester surfactants such as Rhodafac™ PE-510 made by Rhone Poulenc; copolymerizable surfactants such as sulfated acrylic polyethers such as SAM 211 from PPG Industries and the like. Other anionic surfactants useful for polymerization include dodecyl benzene sulfonate, lauryl sulfate and the like.

It is believed that nonionic surfactants which are more compatible with the acrylic polymers, and which contain about 8 or more mols ethylene oxide per mol surfactant tend to compatibilize in the shell and not be present in the interstitial space.

In order to ensure good stability in the polymerization process and provide particles having good water whitening (boiling water) resistance, it was found necessary to employ at least one nonionic and an anionic surfactant preferably in a total nonionic to anionic surfactant weight ratio of at least about 1:1, preferably at least 1.5:1, more preferably from about 1.5:1 to about 6:1, more preferably from about 1.5:1 to about 4:1.

Among the nonionic surfactants that can be used are octyl and nonylphenol ethoxylates such as the Igepal™ surfactants made by Rhone Poulenc; Polystep™ surfactant made by Stepan Chemical Co. and the like. Copolymerizable nonionic surfactants such as SAM 185N, nonylphenoxypoly (ethyleneoxy)-ethyl acryl(methacry)lates available from Monomer-Polymer Labs and the like may also be used. Ingepal™ Co-887 is the presently preferred nonionic surfactant.

The acrylic emulsion PSA polymers of the invention are comprised of a predominant amount of one or more alkyl acrylate esters of an alcohol containing at least 4 carbon atoms, at least one partially water soluble comonomer, and at least one polar comonomer.

The alkyl acrylate esters serve to control the glass transition temperature (Tg) and the modulus of the formed polymer and are generally present in an amount of from about 55 to about 90% by weight, and preferably from about 55 to about 85% by weight of total monomers.

Alkyl acrylate esters of an alcohol which form the bulk of the monomers of the core and which contain at least 4 carbon atoms in the alkyl group of the alcohol include, among others, n-butyl acrylate, 2-ethyl hexyl acrylate, hexyl acrylate, decyl acrylate, dodecyl acrylate, isooctylacrylate and the like. Methacrylates can also be used. N-butyl acrylate, 2-ethyl hexyl acrylate and mixtures thereof are presently preferred.

A partially water soluble comonomer is required to ensure adequate boiling water or water whitening resistance. It is believed that this comonomer copolymerizes with the polar comonomer and alkyl acrylate ester to form the shell around the emulsion particle core that compatibilizes electrolytes and the anionic surfactant. Partially water soluble comonomers including methyl acrylate, ethyl acrylate, methyl methacrylate, vinyl acetate and the like may used in order to obtain the desired opacity. Methyl acrylate (5.6% by weight soluble in water @45° C.) and/or methyl methacrylate (1.5% by weight soluble in water @45° C.) are preferred. The partially water soluble monomer content is above about 7% preferably from about 8% to about 25% by weight of total monomers. Levels of about 8 to about 20% by weight of monomers provides optimum opacity and levels above about 10% are generally not required except to modify adhesive properties or glass transition temperature.

In addition to partially water soluble comonomer, a highly polar comonomer is required to be present. The amount of polar comonomer is generally in the range of from about 1 to about 10% by weight of the monomers. The preferred polar comonomers are carboxylic acids containing from 3 to about 5 carbon atoms. Acrylic acid and a mixture of acrylic and methacrylic acids are presently preferred. Among the carboxylic acids, there may be mentioned acrylic acid, methacrylic acid, maleic acid, fumaric acid, itaconic acid, and the like.

Results to date show that use of a mixture of polar monomers synergistically gives an opacity lower than the same amount of each polar monomer separately. It is well known in the literature that methacrylic acid tends to become buried inside the particle inner layer to a greater extent than acrylic acid during emulsion polymerization. Combination of polar monomers which tend to partition differently between the polymer particles and the aqueous phase during emulsion polymerization may therefore be effectively used to provide an outer layer which solubilizes hydrophilic species.

Other polar comonomers containing carboxylic and hydroxyl groups can also be used. Examples of such polar comonomers could be beta-carboxyethyl acrylate, monomethacryloylethyl succinate, monomethacryloylethyl phthalate, polyethylene(propylene) glycol monoacry (methacry)lates, 2-hydroxyethyl acry(methacry)late, 2-hydroxypropyl acry(methacry)lates and the like.

Other modifying monomers for the acrylic emulsion polymers include one or more diesters of a dicarboxylic acid wherein each ester group of the diester acid independently contains from about 8 to about 16, preferably from about 8 to about 12 carbon atoms. Examples of diesters are di-2-ethyl hexyl maleate, di-2-ethyl hexyl fumarate and mixtures thereof.

Other comonomers, such as styrene, tertiary butyl styrene and the like, may be used to modify the $T_g$ or other copolymer properties.

Other comonomers including N-vinyl caprolactam, hydroxyethyl(propyl) (meth)acrylate, acetoacetoxyethyl (meth)acrylate, and the like, could be used to further enhance adhesion to various surfaces and partitioning between the aqueous and particle phases while other comonomers, such as glycidyl methacrylate or allyl glycidyl ether, can also be used to further enhance high temperature shear properties. Multifunctional acrylates can also be used to cause crosslinking and improve shear properties.

Chemical crosslinkers provided in an amount of up to about 1% by weight, can be effectively used to further increase cohesive strength. These include chromium acetate, zirconium ammonium carbonate, aluminum acetate and the like. Crosslinking may also be achieved using actinic or electron beam radiation.

The copolymers of the instant invention can be stabilized against UV and oxidative degradation by using UV stabilizers and antioxidants.

In addition, fillers, colorants and the like, tackifiers, plasticizers and oils may be added to modify the properties of the acrylic emulsion polymers of this invention.

The monomer proportions are typically adjusted in such a way that the PSA polymers have a $T_g$ of least 10° C. below their use temperature and preferably be from about 0° C. to about −60° C. as measured by a differential scanning calorimeter. Use temperature is the temperature at which a face stock-adhesive laminate is typically applied to a substrate and is normally 25° C.

In any event, the polymer, as part of a PSA laminate, has to be designed to convert well, i.e., to slit, diecut, matrix strip, run on printing presses and be dispensed from labeling machinery to clear substrates such as glass bottles.

The acrylic emulsion polymers of this invention are to provide adhesion and tack at room temperature, elevated and low temperatures, to glass and coated glass or other clear surfaces. What is essential is that they provide low opacities by the boiling water resistance test or minimal changes in opacity by the resistance test to room temperature water.

Polymerization can be carried out in the presence of electrolytes such as tetrasodium pyrophosphate to regulate particle size and emulsion viscosity. Electrolytes generally cause particle size to increase with an increase in electrolyte content and this can increase opacity.

Independent of the use of electrolytes during polymerization, it was unexpectedly found that the post-polymerization addition of small levels of an inorganic electrolyte to the latex stabilizes the cast film against increases in opacity with time. This was unexpected because the relevant literature makes clear that water resistance would be adversely affected by the addition of water sensitive species such as electrolytes. However, our results clearly demonstrate the films containing added inorganic electrolytes retained the initial level of percent opacity even after long term aging. The amount of electrolyte to be added will range from about 0.01 to about 0.25, preferably from about 0.03 to about 0.1, percent by weight of the emulsion.

It is presently preferred to employ as added electrolyte alkali metal sulfates, alkaline earth metal sulfates, alkali metal acetates, alkaline earth metal acetates, alkali metal phosphates, alkaline earth metal phosphates and the preferred metal is sodium.

Particle size also controls opacity. Emulsions having mean "volume-average" particle diameters of up to about 210 nm, preferably of up to about 165 nm, as measured using the Nicomp Instrument spectrometer were found to have good opacities while emulsions having a larger mean volume average particle diameters had greater opacities than required for use as a clear PSA.

Conventional water soluble free radical initiators can be used for polymerization. They include potassium persulfate, ammonium persulfate and sodium persulfate. Other initiators such as water soluble azo initiators (such as Wako V-50 made by Wako Chemicals USA, Inc), redox initiators such as per sulfate/bisulfite catalyst systems can also be used. The results indicate that a small amount of strong acid groups may be necessary in the outer layer of the polymer particles to compatibilize with the strong acid groups of the anionic surfactant. Results also indicate that with low or no per sulfate content, opacities are high. This is contrary to expectation since higher water resistance as indicated by the absence of such water sensitive sulfate groups at the surface was regarded as important to good water whitening resistance.

The emulsion polymers of the instant invention are formed at a solids level of about 45% by weight solids or more preferably from about 50% to about 60% by weight solids and when cast from emulsion onto a face stock (direct coating) or transferred from a release surface to a face stock (transfer coated) are to provide clear coatings at coat weights of about 20 to about 22 g/m² with low percentage opacities as per the boiling water resistance test.

Percent opacity of the cast film should be about 5% or less, preferably about 2.5% or less, or more preferably about 1.5% or less, as determined in the boiling water resistance test, or should remain essentially unchanged in the room temperature water resistance test. Direct coated film laminates generally give lower opacities than transfer coated film laminates.

Besides providing adhesives for "no-label" look applications, adhesives of this invention have been found to have applications unexpected for emulsion PSAs.

One utility is resistance to autoclaving. Autoclaving is a severe exposure of the labeled vial to steam under pressure and temperatures. Adhesives must resist degradation and resist water whitening. Adhesives of the instant invention were evaluated against sterilizable solvent based acrylic adhesives for autoclaving applications. It was unexpectedly found that the solvent based adhesives would water whiten in an autoclave whereas emulsion adhesives of the instant invention, which were expected to fail, remained clear under the action of autoclaving. This is a surprising result and opposite to what was expected. This makes the adhesives particularly useful as label adhesives for substrates for pharmaceutical and medical applications where autoclaving conditions can be expected. They include containers, vials, syringes and the like where clarity is important.

For the same and other applications, the adhesives were found to have excellent mandrel performance under overlap conditions and excellent adhesion to siliconized glass. Excellent mandrel performance and unique water whitening resistance of adhesive compositions also allows their use as wet stick label adhesives. Wet stick properties are important to the application of labels to substrate such as wine bottles having condensation on their surface as a consequence of being chilled during a filling operation preceding a labeling operation and where condensation of moisture from the atmosphere provides a bottle with water droplets and possibly a film of water. Where such conditions exist the adhesives have been found to take up the moisture of the surface on the bottles without water whitening and adequate adhesion.

The adhesion is excellent and the adhesives may be used for wet stick labeling of bottles that have been coated with a low surface energy coating, such as polyethylene waxes and fatty acid salts, to reduce scratching during conveying of bottles to filling and labeling stations.

Another unique application, in consequence of excellent mandrel performance, is the use of adhesives as a battery label adhesives where the label must vigorously adhere to the case of a battery under low temperature, elevated temperatures, high humidity conditions and under thermal shock conditions.

Another application is as an adhesive for vehicular fleet marking (such as those used to decorate sides of large trucks which have rivets and corrugations) films where the adhesive would stand exposure to the elements for long periods of time and yet be removable from a substrate without excessive adhesive residue and adhere well to rivets so as to avoid tenting. For such applications it is preferred that adhesives have a total acid content of at least about 4.5% to about 10% by weight of the monomers.

In use, the PSA, copolymers of the invention are employed as part of a label laminate of clear or transparent face stock and PSA provided as a self wound tape or label. They are typically applied to clear substrates such as glass or plastic bottles and the like.

In addition to the Boiling Water Resistance and Room Temperature Water Resistance Tests, the following tests were also performed.

Room Temperature Shear

Room temperature shear was measured by applying samples of adhesive coated film measuring 1.25 cm×5 cm strips to a 1.25×1.25 cm area of the stainless steel panel. The film is rolled down twice with a 2 kg rubber-clad roller at the rate of 30 cm/min. The panel is then clamped in a vertical position with 500 g weight attached to the exposure end of the strip. The time elapsed before the weight pulls the sample from the panel is measured in minutes % Gel The % gel content was measured by placing an amount of dry adhesive, e.g. 75 mg., in a 10 micron polytetrafluoroethylene membrane filter. The edges of the membrane are sealed to contain the sample and placed in a 20 ml. vial containing tetrahydrofuran. The vial is tumbled for 24 hr., filter taken out and dried at elevated temperature under vacuum. The filter is weighed and the percent insolubles is calculated by the formula:

$$\% \text{ Insolubles} = \frac{\text{final weight of sample}}{\text{initial weight of sample}} \times 100$$

Hot Water Bottle Peel

The clear film labels employing the adhesives of this invention are normally applied to glass bottles with minimum application pressure. The adhesive is formulated to wet out rapidly on bottles so as to give a "no label look" within about 24 hr. of application. During bottle making, the glass bottles may be treated with ingredients to prevent the bottles from scratching. The adhesive should also adhere to such treated surfaces and maintain good adhesion characteristics even under severe conditions such as exposure to high water temperatures. This characteristic is determined by what is known as a hot water bottle peel test (HWBP). In this test, a 1"×8" strip of adhesive coated on BOPP face stock at a coat weight of 20–22 $g/m^2$ is applied to a glass bottle with no applied pressure, allowed to dwell for 20 min. and then immersed in water maintained at 77° C. for 0.5 hour. At the end of this period, the bottle is taken out and 90° peel immediately measured. Peel is reported in Newtons per meter (N/m).

Examples

The following data of Examples 1 to 92 shows various polymerization and post-polymerization conditions on the ability to obtain and maintain water whitening resistance. Attached Table I contains the meaning of certain abbreviations in Tables II to Table IX. Examples 93 to 96 and Controls A to D establish unique application for the pharmaceutical and medical labels, wet stick labels, battery labels and fleet marking labels.

EXAMPLE 1

There was formed a reactor charge containing a solution of 1.14 g of Disponil FES-32 (32% solids, manufactured by Henkel) dissolved in 123 g of deionized water. A pre-emulsion feed soap solution was formed by dissolving 0.34 g of Aerosol TO-75 (75% solids), 0.5 g Aerosol A501 (50% solids), 2.27 g of Disponil FES-32 and 4.19 g of Polystep F-4 in 93 g of deionized water.

A monomer mix was made up with 222.4 g of 2-ethyl hexyl acrylate, 73 g of n-butyl acrylate, 52 of methyl acrylate, 6.3 g of methacrylic acid, 9 g of acrylic acid and 0.037 g of n-dodecyl mercaptan. The monomer mix was added to the pre-emulsion solution with mixing and was stirred till the viscosity was about 2000 cps (Brookfield, RV,#3@12 rpm).

An "Aqueous Feed" solution was prepared by dissolving 1 g of potassium persulfate in 106 g of deionized water. A kickoff initiator solution was formed of 0.75 g of potassium persulfate in 15 g of deionized water.

The reactor charge was introduced to a 1 liter reactor which was flushed with nitrogen. The reactor charge was heated to 78° C. and the kickoff initiator solution added. The mixture were held for 10 min. at 78° C. The pre-emulsion feed was started at the rate of 1.99 g/min. Ten min. after start of pre-emulsion feed, the Aqueous Feed was added at the rate of 0.89 g/min. The pre-emulsion was added over four hr. The Aqueous Feed was added over 4 hr. Throughout the feeds, the temperature inside the reactor was maintained at about 80° C. After the feeds were completed, the contents were held at 80° C. for an additional 45 min. and then cooled. Final pH was 3.1. The latex was neutralized with a dilute ammonium hydroxide solution to a pH of 7.9. The final latex solids were 51.3%. Viscosity was 3150 cps (Brookfield, RV, #4@20 rpm). Particle diameter was 112 nm.

The latex was coated directly onto a 2 mil BOPP face stock (Label-Lyte 434-Mobil), dried in an oven at 70° C. for 10 min. to a dry coat weight of 20–22 g/m² and laminated to a 1.5 mil polyester release liner. A sample cut out from this laminate was used for the boiling water resistance test, i.e., the release liner was removed, the adhesive-face stock laminate immersed in boiling water for 10 min. and then laminated to 2 ml clear Mylar™ and the opacity of the laminate was found to be 1.21%.

The Room Temperature Water Resistance Test was employed for the products of Example 1 in comparison to a normally clear commercial general purpose permanent (GPP) PSA, the percentage opacity of the product of Example 1 increased by 0.31 percentage point while the percentage point increase in opacity of the GPP adhesive was 12 percentage points.

EXAMPLE 2

There was formed a reactor charge containing a solution of 0.65 g of Disponil FES-32, 0.35 g of Polystep F-5, 0.16 g of Aerosol A-501 dissolved in 123 g of deionized water. A pre-emulsion feed soap solution was formed by dissolving 0.34 g of Aerosol TO-75, 0.34 g of Aerosol A-501, 2.76 g of Disponil FES-32 and 3.88 g of Polystep F-5 in 110 g of deionized water.

A monomer mix was made up with 217.4 g of 2-ethyl hexyl acrylate, 84 g of n-butyl acrylate, 46 of methyl methacrylate, 6.5 g of methacrylic acid, 9.1 g of acrylic acid and 0.248 g of n-dodecyl mercaptan. The monomer mix was added to the pre-emulsion solution with mixing and was stirred till the viscosity was about 2000 cps (Brookfield, RV,#3@12 rpm).

An "Aqueous Feed" solution was prepared by dissolving 1 g of potassium persulfate in 106 g of deionized water. A kickoff initiator solution was formed of 0.75 g of potassium persulfate in 15 g of deionized water.

The reactor charge was introduced to a 1 liter reactor which was flushed with nitrogen. The reactor charge was heated to 78° C. and the kickoff initiator solution added. The mixture were held for 10 min. at 78° C. The pre-emulsion feed was started at the rate of 1.99 g/min. Ten minutes after start of pre-emulsion feed, the Aqueous Feed was added at the rate of 0.89 g/min over 4 hr. Through out the feeds, the temperature inside the reactor was maintained at about 80° C. After the feeds were completed, the contents were held at 80° C. for an additional 45 min. and then cooled.

The final solids was 51.4%, pH was 3.2 and latex viscosity was 400 cps (Brookfield, RV, #@20 rpm). The latex was neutralized with a dilute ammonium hydroxide solution to a pH of 7.8. The final viscosity was 3350 cps (Brookfield, RV, #4@20 rpm) and particle diameter was 124 nm.

The latex was coated directly onto a 2 mil BOPP face stock (Label-Lyte 434-Mobil), dried in an oven at 70° C. for 10 min. to a dry coat weight of 20–22 g/m²and laminated to a 1.5 mil polyester release liner. A sample was evaluated using the boiling water resistance test. Opacity was found to be 1.35%.

EXAMPLE 3

There was formed a reactor charge containing a solution of 0.9 g of Disponil FES-32 dissolved in 123 g of deionized water. A pre-emulsion feed soap solution was formed by dissolving 0.39 g of Aerosol OT-75, 2.61 g of Disponil FES-32 and 3.9 g of Polystep F-4 in 110 g of deionized water.

A monomer mix was made up with 240 g of 2-ethyl hexyl acrylate, 55 g of n-butyl acrylate, 55 of methyl methacrylate, 6.5 g of methacrylic acid, 9.1 g of acrylic acid and 0.238 g of n-dodecyl mercaptan. The monomer mix was added to the pre-emulsion solution with mixing and was stirred till the viscosity was about 2000 cps (Brookfield, RV,#3@12 rpm).

An "Aqueous Feed 1" solution was prepared by dissolving 0.74 g of Disponil FES-32, 1.25 g Polystep F-5 and 0.5 g of potassium persulfate in 70 g of deionized water.

An "Aqueous Feed 2" solution was prepared by mixing 0.50 g of potassium persulfate in 50 g of deionized water.

A kickoff initiator solution was formed of 0.75 g of potassium persulfate in 15 g of deionized water.

The reactor charge was introduced to a 1 liter reactor and was flushed with nitrogen. The reactor charge was heated to 78° C. and the kickoff initiator solution added. The mixture were held for 10 min. at 78° C. The pre-emulsion feed was started at the rate of 1.99 g/min. Ten minutes after start of pre-emulsion feed, the Aqueous Feed 1 was added at the rate of 0.6 g/min. The pre-emulsion was added over four hr. Aqueous Feed 1 was added over two hr. After completion of addition of the Aqueous Feed 1, Aqueous Feed 2 was started and added at the rate of 0.42 g/min. for two hr. Through out the feeds, the temperature inside the reactor was maintained at about 80° C. After the feeds were completed, the contents were held at 80° C. for an additional 45 min. and then cooled.

The final solids were 50.44%, pH was 2.3 and latex viscosity was 480 cps (Brookfield, RV, #4@20 rpm). The latex was neutralized with a dilute ammonium hydroxide solution to a pH of 7.8. The final viscosity was 3100 cps (Brookfield, RV, #4@20 rpm) and particle diameter was 114 nm.

The latex was coated directly onto a 2 mil BOPP face stock (Mobil-Label-Lyte 434), dried in an oven at 70° C. for 10 min. to a dry coat weight of 20–22 g/m² and laminated to a 1.5 mil polyester release liner. Opacity by the boiling water resistance test was found to be 1.08%.

EXAMPLE 4

There was formed a reactor charge containing a solution of 0.9 g of Disponil FES-32 dissolved in 123 g of deionized water. A pre-emulsion feed soap solution was formed by dissolving 0.39 g of Aerosol TO-75, and 4.8 g of Polystep F-5 in 105 g of deionized water.

A monomer mix was made up with 240 g of 2-ethyl hexyl acrylate, 55 g of n-butyl acrylate, 55 of methyl methacrylate, 6.5 g of methacrylic acid, 9.2 g of acrylic acid and 0.238 g of n-dodecyl mercaptan. The monomer mix was added to the pre-emulsion solution with mixing and was stirred till the viscosity was about 2000 cps (Brookfield, RV,#3@12 rpm).

An "Aqueous Feed 1" solution was prepared by dissolving 1.5 g of Polystep F-5 and 0.5 g of potassium persulfate in 60 g of deionized water.

An "Aqueous Feed 2" solution was prepared by mixing 0.5 g of potassium persulfate in 60 g of deionized water.

A kickoff initiator solution was formed of 0.75 g of potassium persulfate in 15 g of deionized water.

The reactor charge was introduced to a 1 liter reactor which was flushed with nitrogen. The reactor charge was heated to 78° C. and the kickoff initiator solution added. The mixture were held for 10 min. at 78° C. The pre-emulsion feed was started at the rate of 1.99 g/min. Ten minutes after start of pre-emulsion feed, the Aqueous Feed 1 was added at the rate of 0.6 g/min. The pre-emulsion was added over four hr. Aqueous Feed 1 was added over two hr. After completion of addition of the Aqueous Feed 1, Aqueous Feed 2 was started and added at the rate of 0.42 g/min for two hr. Through out the feeds, the temperature inside the reactor was maintained at about 80° C. After the feeds were completed, the contents were held at 80° C. for an additional 45 min. and then cooled.

The final solids was 50.5%, pH was 2.52 and latex viscosity was 420 cps (Brookfield, RV, #4@20 rpm). The latex was neutralized with a dilute ammonium hydroxide solution to a pH of 7.9. The particle diameter was 137 nm.

Opacity by the boiling water resistance test was found to be 0.8%.

EXAMPLE 5

There was formed a reactor charge containing a solution of 0.855 g of Disponil FES-32 dissolved in 123 g of deionized water. A pre-emulsion feed soap solution was formed by dissolving 2.7 g of SAM 211 (80% solids, PPG), 0.69 g tetra sodium pyrophosphate and 3.87 g of Polystep F-4 in 93 g of deionized water.

A monomer mix was made up with 287.4 g of 2-ethyl hexyl acrylate, 59 of methyl methacrylate, 6.3 g of methacrylic acid, 9 g of acrylic acid and 0.24 g of n-dodecyl mercaptan. The monomer mix was added to the pre-emulsion solution with mixing and was stirred till the viscosity was about 2000 cps (Brookfield, RV,#3@12 rpm).

An "Aqueous Feed 1" solution was prepared by dissolving 0.3 g of SAM 211, 1.29 g of Polystep F-5 and 0.5 g of potassium persulfate in 77 g of deionized water.

The "Aqueous Feed 2" solution was prepared by mixing 0.5 g of potassium persulfate in 53 g of deionized water.

A kickoff initiator solution was prepared by mixing 0.75 g potassium persulfate in 15 g of deionized water.

The reactor charge was introduced to a 1 liter reactor which was flushed with nitrogen. The reactor charge was heated to 78° C. and the kickoff initiator solution added. The mixture were held for 10 min. at 78° C. The pre-emulsion feed was started at the rate of 1.99 g/min. Ten minutes after start of pre-emulsion feed, the Aqueous Feed 1 was added at the rate of 0.60 g/min. The pre-emulsion was added over four hr. Aqueous Feed 1 was added over two hr. After completion of the Aqueous Feed 1, Aqueous Feed 2 was started and added at the rate of 0.42 g/min for two hr. Through out the feeds, the temperature inside the reactor was maintained at about 80° C. After the feeds were completed, the contents were held at 80° C. for an additional 45 min. and then cooled.

The pH was 2.8 and latex viscosity was 260 cps (Brookfield, RV, #4@20 rpm). The latex was neutralized with a dilute ammonium hydroxide solution to a pH of 7.8.

The final latex solids were 49.4%, viscosity was 7300 cps (Brookfield, RV, #4@20 rpm) and particle diameter was 136 nm.

Opacity by the boiling water resistance test was found to be 1.27%.

EXAMPLES 6–27 AND TABLE II

Table II shows the effect of surfactant choice on opacity. The principal surfactant employed was "Anionic 1." "Anionic 2" contained no ethylene oxide units while "Anionic 3" was a proprietary blend contained an unknown amount of ethylene oxide units. The supplemental anionics were useful for other conditions such as stabilization of the emulsion. An opacity of about 2.5% or less may be regarded as "good" while products having an opacity less than 5 may also be employed. We found that with an anionic surfactant, the level of ethoxylation has to be below about 10 moles per mole for good hot water resistance. When the moles of ethylene oxide were about 10 or at times when at 10, higher opacities were obtained. When a anionic surfactant was the only surfactant system employed, opacities were not reproducible. That is, opacity varied significantly from drawdown to drawdown, where drawdown is the forming of a coated layer to a coat level of 20–22 g/sq. meter (see Example 10). This lead to the use of a non-anionic surfactant. Employing an anionic surfactant of 4 ethylene oxide units and a non-ionic surfactant of 8 or more ethylene oxide units gave very low opacities. Without being bound by theory, it is believed that the nonionic surfactants which are compatible with the acrylic polymers are present to the lesser degree in the interstitial spaces between particles.

EXAMPLES 28 TO 38 AND TABLE III

The partly water soluble monomer is believed to be primarily present in the shell of the polymer particle and renders the particle more hydrophilic by polymerizing with the polar comonomer and the alkyl acrylate to provide a transition from a hydrophobic inner layer which is primarily an alkyl acrylate outward to a polar end group which imparts hydrophilicity. This allows the surfactants to disperse within the outer layer of the polymer particle enhancing resistance to water whitening as indicated by low opacity. The absence of partially water soluble comonomer resulted in too high and opacity (Ex. 28) or significantly inconsistent opacities (Ex. 30 and 34).

EXAMPLES 39 TO 43 AND TABLE IV

Table IV shows the effect of particle size on opacity in that a variety of polymers formed having a mean "volume-average" particle diameter approaching 150 nm had borderline opacities, where measured by an older Nicomp Particle Size analyzer. In general, due to calibration errors, this older instrument measured mean "volume-average" particle diameter lower by ten to twenty percent than the Nicomp Particle Size analyzer previously described. When the mean "volume-average" particle diameter was about 198 nm, opacity was unacceptable.

EXAMPLES 44–49 AND TABLE V

Table V shows the effect of initiator on opacity. The results show that when too little persulfate is employed or is absent, opacities are high, indicating the likelihood that persulfate beneficially provides water sensitive sulfate groups at the surface of the outer layer of the polymer. This is contrary to expectation since a lack of sulfate groups would have been expected to induce water-resistance by eliminating the presence of water sensitive groups in the outer layer.

EXAMPLES 50–56 AND TABLE VI

Table VI, independent of surfactant system, shows the general effect of carboxylic acid on opacity. Acrylic acid and mixtures of methacrylic and acrylic acids gave significantly better opacities than methacrylic acid alone.

EXAMPLES 57 TO 69 AND TABLE VII

Table VII, shows the effect of pH and base on opacity. Below a pH of seven opacities are quite high. The best results are obtained for ammonium hydroxide at a pH above 7.0.

EXAMPLES 70 TO 79 AND TABLE VIII

Table VIII shows the effect of the use of crosslinking monomers and chain transfer agents on bottle peel and shear.

EXAMPLES 80 TO 92 AND TABLE IX

Table IX shows the effect of post-polymerization addition of an electrolyte to the emulsion on changes in opacity with time, as determined by the Boiling Water Resistance test. Percent opacity as polymerized was determined using the Boiling Water Resistance test immediately after coating and drying. A group of coated and dried film constructions were placed in an oven at 50° C., a separate group also was retained for testing. Samples were removed from time to time from one or both groups of retained samples and subjected to the Boiling Water Resistance test. The time of the test in days is shown in Table IX, as is the percent opacity, determined using the Boiling Water Resistance Test. The starting point (Ex. 80 and 84) were the emulsions as formed according to Example 3 with addition of ammonium hydroxide to a pH of 7.5–8.0. No electrolyte was post-polymerization added, and opacity of films drawn from the emulsion increased significantly with days(d) of aging, whether at room temperature or at 50° C. as determined by the Boiling Water Resistance test. When an electrolyte was post-polymerization added, retention of initial opacity, again as determined by the Boiling Water Resistance test, was excellent.

The product of Example 5, which had an initial opacity of 1.27% and to which no electrolyte was added after polymerization, had, following aging for two days at 50° C., an opacity by the Boiling Water Resistance test, of 3.03%.

TABLE I

| | |
|---|---|
| EHA | 2 ethylhexyl acrylate |
| BA | n-butyl acrylate |
| MeA or MA | methyl acrylate |
| MMA | methylmethacrylate |
| MAA | methacrylic acid |
| AA | acrylic acid |
| TSPP | tetrasodium pyrophosphate |
| Disponil FES-77 | sodium lauryl ether sulfate - 30 moles ethylene oxide (Henkel) |
| Disponil FES-993 | sodium lauryl ether sulfate - 10 moles ethylene oxide (Henkel) |
| Disponil FES-32 | sodium lauryl ether sulfate - 4 moles ethylene oxide (Henkel) |
| Aerosol A-501 | proprietary monoester sulfosuccinate (Cytek) |
| Aerosol OT-75 | sodium dioctyl sulfosuccinate (Cytek) |
| NPES-930 | ammonium salt of sulfated nonylphenoxy poly(ethyleneoxy)ethanol - 9 moles Ethylene oxide (Cytek) |
| Rhodafac PE-510 | aromatic phosphate ester - 6 moles ethylene oxide (Rhone Poulenc) |
| Polystep F4 | nonylphenol ethoxylate - 10 moles ethylene oxide (Stepan) |
| Polystep F5 | nonylphenol ethoxylate - 12 moles ethylene oxide (Stepan) |
| Polystep F3 | nonylphenol ethoxylate - 8 moles ethylene oxide (Stepan) |
| Igepal CO-850 | nonylphenolethoxylate - 20 moles ethylene oxide (Rhone Poulenc) |
| Igepal CO-887] | nonylphenolethoxylate - 30 moles ethylene oxide (Rhone Poulenc) |
| SAM 211 | surface active monomer - 15 moles ethylene oxide (PPG) |
| HEA | hydroxyethyl acrylate |
| VAc | vinyl acetate |
| HDODA | hexanediol diacrylate |
| n-DDM | n-dodecyl mercaptan |
| pphm | parts per hundred parts monomers |
| PSize | mean volume average particle diameter |

TABLE II

Effect of Surfactant on opacity

| Ex. | EHA | BA | MeA | MMA | MAA | AA | TSPP pphm | Anionic 1, pphm, moles EO | Anionic 2, pphm | Anionic 3, pphm | Anionic 4, pphm (moles EO) | Nonionic, pphm (moles EO) | pH | PSize, nm | % opacity |
|---|---|---|---|---|---|---|---|---|---|---|---|---|---|---|---|
| 6 | 22 | 64 | 10.3 | 0 | 3 | 1.5 | 0.29 | Disponil FES-77, 1.43, 30 | Aerosol OT-75, .11 | Aerosol A-501, .1 | 0 | 0 | 7.2 | 140 | >5 |
| 7 | 22 | 64 | 10.3 | 0 | 2.9 | 1.4 | 0.29 | Disponil FES-993, 1.39, 10 | Aerosol OT-75, .11 | Aerosol A-501, .1 | 0 | 0 | 7.2 | | >5 |
| 8 | 22 | 64 | 10.3 | 0 | 3 | 1.5 | 0.29 | Cytec NPES-930, 1.34, 9 | Aerosol OT-75, .11 | Aerosol A-501, 1 | 0 | 0 | 7.2 | | 4.9 |

TABLE II-continued

Effect of Surfactant on opacity

| Ex. | EHA | BA | MeA | MMA | MAA | AA | TSPP pphm | Anionic 1, pphm, moles EO | Anionic 2, pphm | Anionic 3, pphm | Anionic 4, pphm (moles EO) | Nonionic, pphm (moles EO) | pH | PSize, nm | % opacity |
|---|---|---|---|---|---|---|---|---|---|---|---|---|---|---|---|
| 9 | 22 | 64 | 10.3 | 0 | 3 | 1.5 | 0.29 | Disponil FES-32, .63, 4 | Aerosol OT-75, .11 | Aerosol A-501, .1 | Disponil FES-993, .67, 10 | 0 | 7.2 | 89 | <5 |
| 10 | 32 | 48 | 15 | 0 | 3 | 1.5 | 0.29 | Disponil FES-32, .63, 4 | Aerosol OT-75, .11 | Aerosol A-501, .1 | Disponil FES-993, .67, 10 | 0 | 7.2 | 72 | 2.5, 5.5 |
| 11 | 32 | 48 | 15 | 0 | 3 | 1.5 | 0.29 | Disponil FES-32, .63, 4 | Aerosol OT-75, .11 | Aerosol A-501, .1 | Disponil FES-993, .67, 10 | 0 | 7.2 | 77 | 3.1 |
| 12 | 60 | 20 | 15.7 | 0 | 1.43 | 2.9 | 0.29 | Disponil FES-32, .63, 4 | Aerosol OT-75, .11 | Aerosol A-501, .1 | Disponil FES-993, .67, 10 | 0 | 7.1 | 103 | 2.6 |
| 13 | 62.3 | 20 | 14.3 | 0 | 1.74 | 1.5 | 0.19 | Disponil FES-32, .24, 4 | Aerosol OT-75, .07 | Aerosol A-501, .07 | Disponil FES-993, .24, 10 | Polystep F4, .96, 10 | 7.2 | 113 | 1.8 |
| 14 | 61.3 | 20 | 14.3 | 0 | 1.74 | 2.54 | 0.19 | 0 | Aerosol OT-75, .07 | Aerosol A-501, .07 | Disponil FES-993, .3, 10 | Polystep F4, 1.16, 10 | 7.2 |  | 6.3 |
| 15 | 61.3 | 20 | 14.3 | 0 | 1.74 | 2.5 | 0.19 | Disponil FES-32, .28, 4 | Aerosol OT-75, .07 | Aerosol A-501, .07 | 0 | Polystep F4, 1.16, 10 | 7.2 | 112 | 1.8 |
| 16 | 61.3 | 20 | 0 | 14.3 | 1.74 | 2.5 | 0.19 | Disponil FES-32, .28, 4 | Aerosol OT-75, .07 | Aerosol A-501, .07 | 0 | Polystep F4, 1.16, 10 | 7.5 | 116 | 1.2 |
| 17 | 61 | 19.3 | 0 | 15.4 | 1.8 | 2.5 | 0.19 | Disponil FES-32, .28, 4 | Aerosol OT-75, .07 | Aerosol A-501, .07 | 0 | Polystep F5, 1.16, 10 | 7.5 | 109 | 1.7 |
| 18 | 61 | 19.9 | 0 | 14.3 | 1.8 | 2.5 | 0.19 | Disponil FES-32, .33, 4 | Aerosol OT-75, .11 | Aerolsol A-501, .11 | 0 | Polystep F3, 1.85, 8 | 7.5 | 106 | 1.6 |
| 19 | 61.4 | 20.1 | 0 | 14.3 | 1.74 | 2.5 | 0.19 | Disponil FES-32, .35, 4 | Aerosol OT-75, .07 | 0 | 0 | Polystep F4, 1.07, 10 Polystep F5, .36, 12 | 8 | 114 | 1.22 |
| 20 | 66.2 | 15.2 | 0 | 15.2 | 1.8 | 2.5 | 0 | Disponil FES-32, .35, 4 | Aerosol OT-75, .08 | 0 | 0 | Polystep F4, 1.07, 10 Polystep F5, .35, 12 | 7.9 | 118 | 0.9 |
| 21 | 66.2 | 15.2 | 0 | 15.2 | 1.8 | 2.5 | 0 | Disponil FES-32, .35, 4 | Aerosol OT-75, .08 | 0 | 0 | Igepal CO-850, 1.41, 20 | 7.8 | 141 | 0.85 |
| 22 | 66.2 | 15.2 | 0 | 15.2 | 1.8 | 2.5 | 0 | Disponil FES-32, .35, 4 | Aerosol OT-75, .08 | 0 | 0 | Igepal CO-887, 1.42, 30 | 7.8 | 162 | 0.95 |
| 23 | 65.6 | 15 | 0 | 15 | 1.78 | 2.5 | 0 | Gafac PF-510, .3, 6 | Aerolsol OT-75, .08 | 0 | 0 | Polystep F4, 1.07, 10 Polystep F5, .34, 12 | 7.8 | 174 | 1.2 |
| 24 | 65.6 | 15 | 0 | 15 | 1.78 | 2.5 | 0 | Disponil FES-32, .08, 4 | Aerosol OT-75, .08 | 0 | 0 | Polystep F5, 1.72, 12 | 7.9 | 137 | 0.82 |
| 25 | 79.4 | 0 | 0 | 16.3 | 1.74 | 2.5 | 0.19 | Disponil FES-32, .08, 4 | 0 | 0 | SAM211, .67, 15 | Polystep F4, 1.07, 10 Polystep F5, .36, 12 | 7.8 | 136 | 1.24 |
| 26 | 79.4 | 0 | 0 | 16.3 | 1.74 | 2.5 | 0 | Disponil FES-32, .08, 4 | 0 | 0 | SAM211, .67, 15 | Polystep F4, 1.07, 10 Polystep F5, .36, 12 | 7.8 | 129 | 0.8 |
| 27 | 79.4 | 0 | 0 | 16.3 | 1.74 | 2.5 | 0 | Disponil FES-32, .08, 4 | 0 | 0 | SAM211, .37, 15 | Polystep F4, 1.07, 10 Polystep F5, .36, 12 | 7.8 | 142 | 0.85 |

TABLE III

| Ex. | EHA | BA | MAA | AA | MeA | MMA | HDODA | TSPP, pphm | opacity % | pH | Viscosity, #4 @ 20 cps | PSize, nm | Surfactant System |
|---|---|---|---|---|---|---|---|---|---|---|---|---|---|
| 28 | 22 | 74 | 2.9 | 1.4 | 0 | 0 | | 0.29 | >5 | 7.4 | | | FES32 + FES993 + OT-75 + A501 |
| 29 | 22 | 64 | 3 | 1.5 | 10.3 | 0 | | 0.29 | <5 | 7.4 | | 88 | FES32 + FES993 + OT-75 + A501 |
| 30 | 32 | 48 | 3 | 1.5 | 15 | 0 | | 0.29 | 2.5, 5.5 | 7.3 | | 72 | FES32 + FES993 + OT-75 + A501 |
| 31 | 32 | 44 | 3 | 1.4 | 20 | 0 | | 0.29 | 1.4 | 7.4 | | 85 | FES32 + FES993 + OT-75 + A501 |
| 32 | 32 | 38 | 2.9 | 1.4 | 25 | 0 | 0.2 | 0.29 | 1.26 | 7.3 | 6700 | | FES32 + FES993 + OT-75 + A501 |
| 33 | 61 | 20 | 1.7 | 2.5 | 14.3 | 0 | | 0.19 | 1.2 | 7.2 | 3150 | 112 | FES32 + F4 + F5 + OT-75 + A501 |
| 34 | 53 | 43 | 1.8 | 2.5 | 0 | 0 | | | 4.3, 2.3 | 7.8 | | 115 | FES32 + F4 + F5 + OT-75 + A501 |
| 35 | 61 | 20 | 1.7 | 2.5 | 0 | 14.3 | | 0.19 | 1.2 | 7.8 | 2700 | 116 | FES32 + F4 + F5 + OT-75 + A501 |
| 36 | 75 | 0 | 1.7 | 2.5 | 0 | 20.7 | | 0.19 | 1.1 | 7.8 | >10,000 | 127 | FES32 + F4 + F5 + OT-75 |
| 37 | 79.3 | 4 | 1.7 | 2.5 | 0 | 12.3 | | 0.19 | 0.95 | 7.8 | 1750 | 126 | FES32 + F4 + F5 + OT-75 |
| 38 | 79.3 | 6.9 | 1.7 | 2.5 | 0 | 9.4 | | 0.19 | 1.5, 2.3 | 7.8 | 1550 | 113 | FES32 + F4 + F5 + OT-75 |

TABLE IV

Effect of particle size on opacity

| Ex. No | EHA | BA | MeA | MAA | AA | TSPP, pphm | pH | % opacity | PSize, nm | % Gel | Surfactant System |
|---|---|---|---|---|---|---|---|---|---|---|---|
| 39 | 60.2 | 20 | 15.7 | 1.74 | 2.5 | 0.29 | 7.2 | 2.14 | 107 | 75.4 | FES32 + FES993 + OT-75 + A501 |
| 40 | 60.2 | 20 | 15.7 | 1.74 | 2.5 | 0.29 | 7.2 | 4.98 | 143 | 73.8 | FES32 + FES993 + OT-75 + A501 |
| 41 | 60.2 | 9.7 | 25.7 | 1.75 | 2.5 | 0.29 | 7.2 | 4.18 | 145 | 76.2 | FES32 + FES993 + OT-75 + A501 |
| 42 | 61.3 | 20 | 14.3 | 1.74 | 2.5 | 0.19 | 7.2 | 1.7 | 129 | 71.7 | FES32 + F4 + OT-75 + A501 |
| 43 | 61.3 | 20 | 14.3 | 1.73 | 2.5 | 0.19 | 7.2 | 6.52 | 198 | 41.9 | FES32 + F4 + OT-75 + A501 |

TABLE V

| Ex. | EHA | BA | MeA | MAA | AA | TSPP, pphm | KPS init, pphm | KPS feed, pphm | Other init, pphm | Psize, nm | % opacity | % Gel | PH Pnm | Surfactant System |
|---|---|---|---|---|---|---|---|---|---|---|---|---|---|---|
| 44 | 61.3 | 20.1 | 14.3 | 1.74 | 2.5 | 0.19 | 0.21 | 0.28 | 0 | 129 | 1.4 | | 7.5 | FES32 + F4 + OT-75 + A501 |
| 45 | 61.3 | 20.1 | 14.3 | 1.74 | 2.5 | 0.19 | 0.14 | 0.14 | 0 | | 2.3 | | 7.5 | FES32 + F4 + OT-75 + A501 |
| 46 | 61.3 | 20.1 | 14.3 | 1.74 | 2.5 | 0.19 | 0.21 | 0.22 | 0 | 198 | 6.5 | 71.9 | 7.2 | FES32 + F4 + OT-75 + A501 |
| 47 | 61.3 | 20.1 | 14.3 | 1.74 | 2.5 | 0.19 | 0.21 | 0 | Wako V-50 feed, .06 | | 8.5 | | 7.2 | FES32 + F4 + OT-75 + A501 |
| 48 | 22 | 64 | 10.3 | 2.9 | 1.4 | 0 | 0.21 | 0.28 | 0 | 150 | >5 | 66.8 | 7.4 | FES32 + OT-75 + A501 |
| 49 | 22 | 64 | 10.3 | 2.9 | 1.4 | 0 | 0 | 0 | Wako V-50 init, .04 Wako V-50 feed, .06 | 131 | >5 | 71.7 | 7.2 | FES32 + OT-75 + A501 |

TABLE VI

| Ex. No | EHA | BA | MeA | MAA | AA | TSPP, pphm | pH | Viscosity, #4 @ 20 cps | opacity % | PSize, nm | Surfactant |
|---|---|---|---|---|---|---|---|---|---|---|---|
| 50 | 32 | 48 | 15.5 | 4.3 | 0 | 0.29 | 7.3 | 1350 | 11.1 | 86.5 | FES32 + FES993 + OT-75 + A501 |
| 51 | 35 | 48 | 14.8 | 3.3 | 1.65 | 0.29 | 7.3 | 1700 | 5.8 | 87 | FES32 + FES993 + OT-75 + A501 |
| 52 | 32 | 48 | 14.6 | 3.8 | 1.4 | 0.29 | 7.3 | 1860 | 3.5 | 87 | FES32 + FES993 + OT-75 + A501 |
| 53 | 32 | 48 | 14.2 | 3.8 | 1.9 | 0.29 | 7.3 | 1900 | 3.8 | 90 | FES32 + FES993 + OT-75 + A501 |
| 54 | 32 | 48 | 15.5 | 0 | 4.3 | 0.29 | 7.3 | 5575 | 2.6 | 85.5 | FES32 + FES993 + OT-75 + A501 |
| 55 | 32 | 48 | 15 | 2.15 | 2.15 | 0.29 | 7.3 | 3100 | 1.01 | 84.5 | FES32 + FES993 + OT-75 + A501 |
| 56 | 32 | 48 | 15 | 1.4 | 2.9 | 0.29 | 7.3 | 2200 | 0.7 | 84 | FES32 + FES993 + OT-75 + A501 |

TABLE VII

| Ex. No. | EHA | BA | MAA | AA | MeA | Comonomer | pH | Base | Opacity % | Surfactant |
|---|---|---|---|---|---|---|---|---|---|---|
| 57 | 21.7 | 63.6 | 2.9 | 1.4 | 10.3 | 0 | 7.3 | NH OH | <5 | FES32 + OT-75 + A501 |
| 58 | 21.7 | 63.6 | 2.9 | 1.4 | 10.3 | 0 | 7.3 | LiOH | >5 | FES32 + OT-75 + A501 |
| 59 | 62 | 20 | 1.7 | 2.1 | 14.3 | 0 | 6.4 | NH OH | 4.4 | FES32 + FES993 + OT-75 + A501 + F4 |
| 60 | 62 | 20 | 1.7 | 2.1 | 14.3 | 0 | 7.2 | NH OH | 1.9 | FES32 + FES993 + OT-75 + A501 + F4 |

TABLE VII-continued

| Ex. No. | EHA | BA | MAA | AA | MeA | Comonomer | pH | Base | Opacity % | Surfactant |
|---|---|---|---|---|---|---|---|---|---|---|
| 61 | 62 | 20 | 1.7 | 2.1 | 14.3 | 0 | 7.3 | C H NH | 4.0 | FES32 + FES993 + OT-75 + A501 + F4 |
| 62 | 62 | 20 | 1.7 | 2.1 | 14.3 | 0 | 7.89 | TEA → 6.4 NH$_4$OH → 7.8 | 2.9 | FES32 + FES993 + OT-75 + A501 + F4 |
| 63 | 32 | 48 | 2.9 | 1.43 | 14 | 2 HEA, 0.2 HDODA | 8.0 | NH OH | 2.0 | FES32 + FES993 + OT-75 + A501 |
| 64 | 32 | 48 | 2.9 | 1.43 | 14 | 2 HEA, 0.2 HDODA | 8.0 | PEI | 11.7 | FES32 + FES993 + OT-75 + A501 |
| 65 | 32 | 48 | 2.9 | 1.4 | 15.5 | 0.2 HDODA | 3.9 | NH OH | 27.7 | FES993 + OT-75 + A501 + FES32 |
| 66 | 32 | 48 | 2.9 | 1.4 | 15.5 | 0.2 HDODA | 6.1 | NH OH | 5.9 | FES993 + OT-75 + A501 + FES32 |
| 67 | 32 | 48 | 2.9 | 1.4 | 15.5 | 0.2 HDODA | 7.35 | NH OH | 2.2 | FES993 + OT-75 + A501 + FES32 |
| 68 | 32 | 48 | 2.9 | 1.4 | 15.5 | 0.2 HDODA | 8.2 | NH OH | 1.15 | FES993 + OT-75 + A501 + FES32 |
| 69 | 32 | 48 | 2.9 | 1.4 | 15.5 | 0.2 HDODA | 9.1 | NH OH | 2.7 | FES993 + OT-75 + A501 + FES32 |

TABLE VIII

| Ex. No. | EHA | BA | MeA | MMA | MAA | AA | Crosslinker, pphm | nDDM, pphm | % Gel | PSize, nm | Opacity | Bottle peel | Shear, min | Surfactant |
|---|---|---|---|---|---|---|---|---|---|---|---|---|---|---|
| 70 | 32 | 48 | 15.5 | 0 | 2.9 | 1.4 | .5 SR-368 | 0.01 | 69.1 | | 3.1 | <100 | 646 | FES32 + FES993 + OT-75 + A501 |
| 71 | 32 | 48 | 15.5 | 0 | 0 | 4.3 | .2 HDODA | 0.01 | 78 | 86 | 2.6 | <100 | 708 | FES32 + FES993 + OT-75 + A501 |
| 72 | 32 | 48 | 15.5 | 0 | 4.3 | 0 | .2 HDODA | 0.01 | 70.4 | 87 | 11.1 | <100 | 379 | FES32 + FES993 + OT-75 + A501 |
| 73 | 60 | 19.7 | 15.7 | 0 | 2.9 | 1.4 | 0 | 0.01 | 73.5 | 108 | 2.7 | 195 | 527 | FES32 + FES993 + OT-75 + A501 |
| 74 | 61.3 | 20 | 0 | 14.3 | 1.7 | 2.5 | 0 | 0.01 | | 116 | 1.3 | 230 | 3270 | FES32 + F4 + OT-75 + A501 |
| 75 | 79.4 | 0 | 0 | 16.3 | 1.7 | 2.5 | 0 | 0.03 | | 129 | 1.2 | | 5085 | FES32 + F4 + F5 + OT-75 |
| 76 | 79.4 | 0 | 0 | 16.3 | 1.7 | 2.5 | 0 | 0.07 | | 139 | 1.2 | 395 | 3800 | FES32 + F4 + F5 + OT-75 |
| 77 | 59.8 | 23.2 | 0 | 12.7 | 1.8 | 2.5 | 0 | 0.07 | | 124 | 1.35 | 485 | 1796 | |
| 78 | 79.3 | 4 | 0 | 12.3 | 1.7 | 2.5 | 0 | 0.1 | 76.5 | 126 | 0.95 | 462 | 987 | FES32 + F4 + F5 + OT-75 |
| 79 | 65.6 | 15 | 0 | 15 | 1.8 | 2.5 | 0 | 0.05 | 64.8 | 130 | 0.85 | 300 | 2330 | FES32 + F4 + F5 + OT-75 |

TABLE IX

AGING TEST

| Ex. | Post Added Electrolyte | % Initial Opacity | R.T. Aging, % Opacity (Days)* | 50° C. Aging, % Opacity (Days)* |
|---|---|---|---|---|
| 80 | none | 1.08 | | 3.31(3 d), 12.59(11 d), 37.45(47 d) |
| 81 | 0.094% TSPP | 1.31 | | 1.03(3 d), 1.14(11 d), 2.25(18 d), |
| | 0.047% TSPP | 0.92 | | 3.64(44 d); 4.15(54 d) |
| 82 | 0.19% TSPP | 0.95 | | 0.79(6 d), 1.16(13 d), 2.35(40 d) |
| 83 | | | | 1.00(6 d), 7.01(40 d) |
| 84 | none | 0.72 | | 0.96(9 d); 2.78(22 d); 3.18(27 d) |
| 85 | 0.05% TSPP | 0.95 | | 0.83(10 d); 1.07(22 d); 1.14(27 d) |
| 86 | 0.06% Na$_2$SO$_4$ anh. | 0.91 | | 0.77(8 d); 0.97(20 d); 1.03(35 d) |
| 87 | 0.03% Na$_2$SO$_4$ anh. | 0.96 | 0.89(59 d) | 0.75(8 d); 0.87(20 d); 1.05(35 d) |
| 88 | 0.04% Na$_3$PO$_4$ 12H$_2$O | 0.94 | | 0.79(8 d); 0.90(20 d); 0.96(35 d) |
| 89 | 0.067% Sodium Acetate | 1.09 | | 0.79(8 d); 0.91(20 d); 0.89(35 d) |
| 90 | 0.04% (NH$_4$)$_2$HPO$_4$ | 8.16 | | 5.84(8 d); 7.42(20 d); 9.09(35 d) |
| 91 | 0.03% NaCl | 1.49 | | 6.21(8 d); 7.16(20 d); 5.65(35 d) |
| 92 | 0.025% TSPP & .03% Na$_2$SO$_4$ | 0.96 | 0.84(58 d) | 0.70(8 d); 0.83(20 d); 0.87(35 d) |

Days* = days after coating and drying of the pressure sensitive adhesive on a BOPP film and formation of a laminate to a release liner.

EXAMPLE 93–96 AND CONTROLS A TO D

Autoclave Resistance

A more stringent exposure for any adhesive laminate is to the action of water in the form of steam in an autoclave under high temperature and pressure. Autoclaving is a requirement for many products used in the pharmaceutical and medical industries. They are typically vessels such as prescription bottles and vials distributed by a pharmacy and containing ethical drugs such as morphine, over the counter medicines, and the like. Another application of adhesive labels is for silicone coated glass surfaces of vessels such as syringes, vials and the like. Such applications require high resistance to water whitening and adhesive degradation and good mandrel performance, as most of the substrates to which a label is to be applied have curved surfaces.

Investigations were made to determine the performance of labels utilizing the clear film adhesives of this invention for label applications where autoclave conditions are experienced. In autoclaving, the labeled substrate is exposed to the action of water and steam under pressure in an environment where, within about 15 min., temperature is ramped up to 121° C. and maintained for 20 min., and then the autoclave ramped down to ambient.

Test labels had a 2 mil BOPP face stock coated with the adhesive of the invention prepared according to Example 2 and comprised of 65.9% 2-ethylhexyl acrylate, 15% by weight butyl acrylate, 15% by weight methyl methacrylate, 1.8% by weight methacrylic acid and 2.5% by weight acrylic acid (Example 93) and laminated to a 1.5 mil siliconized polyester film. This construction was evaluated against a product known as Reveal employing rigid polyester face stock 1.5 mils thick coated with a high performance solvent acrylic adhesive which is known as FDA815K. Reveal is a commercial laminate sold by Avery Dennison and is known to be sterilizable. Table X compares the adhesive properties of Example 93 to Reveal, Table XI compares Mandrel performance and Table XII autoclave performance. In addition, and by comparison, the product of the invention is regarded as more cost effective and environmentally friendly as compared to the solvent base adhesive employed in the Reveal construction. In the Mandrel performance test, comparisons were made using a label overlap of ⅛ inch. The Example 93 product was also tested under conditions of high heat, humidity and freezer conditions without label lifting. The overall conclusion was that the Reveal product could not be recommended for use with mandrels less than 0.5 inch in diameter, whereas the product of Example 93 can be recommended for mandrels down to 0.25 inch diameter. Moreover, the construction of Example 93 can be recommended where clarity is required during and shortly after autoclaving and where silicone coated substrates are to be labeled for all applications when a 0.125 to 0.25 inch overlap is employed.

TABLE X

|  | Ex 93 | Reveal |
| --- | --- | --- |
| Loop Tack (N/m) | 490.3 | 227.6 |
| Peel Adhesion (N/m) | 315.2 | 367.7 |
| Shear | High | High |
| Clarity | Excellent | Excellent |
| Die Cutting | Excellent | Excellent |
| Adhesive Ooze | Low | Low |

TABLE XI

|  | Ex 93 | Reveal |
| --- | --- | --- |
| 7/16" Glass | No Lift | Some Lift |
| 9/16" Glass | No Lift | No Lift |
| 12/16" Glass | No Lift | No Lift |
| ⅜" Si Coated Glass | No Lift | Severe Lift |
| ¼" HDPE | No Lift | Severe Lift |
| ½" HDPE | No Lift | Some Lift |

Si: Silicone
HDPE: High Density Polyethylene

TABLE XII

| Ex 93 | Reveal |
| --- | --- |
| Stays Clear in Autoclave (slight bluish tint in overlap area) | Turns Milky White in Autoclave |
| Clears Up Within 24 Hours | Clears Up Within 24 Hours |
| Minor Shrinkage (1/64 inch) | No Shrinkage |

Wet Stick Applications

Some adhesives must be applied to the substrate under wet conditions. An example is the labeling of wine bottles. Wine bottles are for instance, filled with cold wine and conveyed to a labeling station. Atmospheric moisture condenses on the surface of the bottle leaving droplets of water or even a water film. To prevent scratching, the bottles are coated with a continuous or discontinuous layer of polyethylene wax or an oleic acid salt or other fatty acid salt. Coating weight is typically about 1 gram or less per square meter and is generally sufficient to prevent scratching of bottles when they rub together in the conveyor line. The construction of Example 93 was compared against two adhesives, Control A and Control B. Control A is a construction known as Mactac Optiflex/PC-3. A solvent acrylic adhesive used for Control B known as PL517 (sold by Avery Dennison). Each was applied to 2 mil BOPP face stock. All were evaluated and or applied to dry 750 ml bottles and to bottles that were chilled and then exposed to the atmosphere with attendant condensation of moisture from the atmosphere. Adhesion in Newtons per meter (N/m) was measured after 15 min. and 24 hr. The results are shown in Table XIII.

TABLE XIII

|  |  | Ex 93 | Control A | Control B |
| --- | --- | --- | --- | --- |
| Dry Bottles | 15 min | 542.8 | 315.2 | 437.8 |
| 90° peel, | 24 hrs | 560.3 | 367.7 | 525.3 |
| Wet Bottles | 15 min | 542.8 | 12.3 | 525.3 |
| 90° peel | 24 hrs | 472.8 | 315.2 | 437.8 |

The Control A labels all removed cleanly from the glass while the Example 93 and Control B labels showed partial transfer of the adhesive.

Control A labels did not adhere at all at 15 min. when applied over water condensation. Example 93 and Control B adhered well. This makes the emulsion adhesive of this invention at least equal to a solvent based acrylic adhesive for wet stick label applications.

Fleet Marking

Fleet marking films are recognized in the art as laminates of a self-supporting polymeric film facestock or backing such as polyvinyl chloride (PVC) and a layer of a PSA for application to substrates, especially vertically oriented substrates. The exposed surface of the PSA of the laminate is in contact with a release linear or the surface of the facestock which is provided with a release coating. Marking films are manufactured in the form of large rolls of the laminate then cut to size depending on the application. Applications may range from automotive pinstriping to large printed signs or individual indicia in the form of or containing letters, numbers, logos and the like.

There are many requirements for a laminate to be used for a marking film. A very important requirement is durability for a period of months or years in that the laminate of the polymeric film facestock and adhesive must remain functional for an expected period of time and after that period of time, the laminate must have retained the ability to be cleanly removed from the substrate without leaving an adhesive residue. Removal is typically with destruction of the facestock in the sense that it is no longer reusable. Accordingly, the adhesives are typically regarded more as "permanent" than as "removable".

Polyvinyl chloride films that have been used for marking the film application have varied in durability depending on service life. Short life vinyl films are used for promotional sign applications where an expected service life is six months to a year and are typically film plasticized with a monomeric plasticizer. Cost is kept low by elimination of any primer or anchor and barrier layers. Medium and long life films (such as Fascal 900 white and FasCal 940 clear vinyls available from Avery Dennison) are typically expected to have a useful life of about 1–3 years and up to about 10 years respectively and contain UV and heat stabilizing packages and polymeric plasticizers. When colored, these vinyls could contain various organic and inorganic pigments. A primer may be employed to enhance anchorage of the pressure-sensitive adhesive to the film and a barrier layer may be employed to inhibit migration of plasticizer from the body of the film into the adhesive. The short and medium life vinyls are typically calendered vinyls and the long life vinyls are cast vinyls. Vinyl films typically have a thickness of from about 1 to 5 mils, typically 2 to 3 mils.

Another requirement particularly for marking of truck panels and the like is for the marking film to conform to corrugated surfaces and rivets when applied over a panel which may be a painted or unpainted aluminum or steel. The ability of the laminate to conform to the contour of the rivet and not lift appreciably after application is highly desirable. A tendency to lift away is known as "tenting" and the greater the separation from the rivet the more unsatisfactory is the product. For purposes of this test, the adhesive of Example 93 was evaluated against a current high performance solvent acrylic prepared according to U.S. Pat. No. 4,812,541 (Control C) and against the adhesive of the instant invention and Controltac Plus 180-10 manufactured and sold by 3M Corporation. (Control D)

A Rivet Performance Test is designed to evaluate how a PSA vinyl marking label, sticker, decal, placard, etc. conforms around rivets, when the marking material is applied on the side of trucks, buses, train cars, etc. which have sheet metal bodies with protruding rivets on the surface thereof.

In the test, the vinyl face of a 4"×4' candidate marking material is laminated against an application tape of the same size. A Fascal TransferRite Tape available from Avery Dennison, similar to masking tape, is typically employed as the application tape. The release liner is removed from the marking material, and the PSA side applied to a clean painted panel with standard unpainted aluminum rivets ¹⁵⁄₁₆" in diameter with one or more rivets per panel spaced at least 2" apart. The marking material is pressed on the panel surface toward the rivet with care taken to avoid creases or wrinkles. A squeegee is used to press down on the marking material which is urged away from the rivet.

The application tape is removed and 3–4 small holes punched with a needle in the film around the rivet to allow escape of entrapped air, with pressing continued down on the marking material manually around the rivet to snugly conform the material to the shape of the rivet. Continued conforming of the material around the rivet is achieved in part using a stiff brush and a rotational brushing action.

The film around the rivet is under stress due to film stretching to conform to the three-dimensional contour of the rivet. The film tends to lift (recover) around the rivet. Tents form and take the shape of rings or ringbands around the rivet. When tenting is low (good rivet performance) the width of the ringband is narrow, and is measured in mm or fractions of a mm. When the rivet performance is poor, the ringband is wide (several mm wide). Reading for tenting are normally taken 30 min. after application, then after 24 hr. or more.

Degree of rivet lift in mm and opacity is shown in Table XIV.

Adhesion to painted and unpainted panels was measured after exposure to QUV for 9 days under wet and dry conditions. The wet exposure cycle consisted of four hr. UV at 68° C. followed by two hr. of no UV at 34° C. under 100% RH. Temperature drop causes water condensation.

The dry exposure was continuous exposure to UV radiation at 50° C. over a nine day period. The data is shown in Table XV. Example 96 is a copolymer containing 69.5% by weight 2-ethylhexl acrylate, 14.8% butyl acrylate, 12.7% methyl methacrylate, 2.7% methacrylate acid, and 3.8% acrylic acid. The composition of Example 94 was a copolymer formed of 65.9% 2-ethylhexl acrylate, 14.8% butyl acrylate, 14.1% methyl methacrylate, 2.1% methacrylic acid, and 3% acrylic acid which represent a 17% increase over the acid content of Example 93. For Example 95, the methyl methacrylate content dropped to 13.4%, methacrylic acid content increased to 2.4% and acrylic acid content to 3.4% for an overall increase of acid content of 34% over the acid content of Example 93. The QUV tests were performed using a UV Weather-O-Meter manufactured by Q Panel Corporation of Cleveland, Ohio. The Weather-O-Meter contains fluorescent QUV-B lamps with a peak emission at 310 nanometers and equipped to evaluate effective UV exposure in the presence or absence of moisture.

TABLE XIV

| Ex/Control | 180° Peel, N/m | Shear, min | Rivet, min | % opacity |
|---|---|---|---|---|
| Exhibit 93 | 920, C | <3000, C | 0.8–1.0 | 1.15 |
| Example 94 | 960, P | 7850, C | 0.8–1.0 | 1.24 |
| Example 95 | 1000, P | 9300, C | 0.6–0.8 | 1.11 |
| Control C | 1000, P | >10000 | 0.5–0.9 | |
| Control D | | | 0.6–0.9 | |

180° peel - 940 clear vinyl, Q.V. for 9 days @ 50° C.,
Al panel Shear - ½ × ½" , 500 g
Rivet test - 900 white vinyl, 24 hr (RT), painted rivet panels;
% opacity - 940 clear vinyl, 24 hr. immersion in DI water.

TABLE XV 9 day QV wet 4 hr UV @ 68° C. and 2 hr no UV @ 34° C., 100% RH

| Ex/Control | 940 FasCal clear/ vinyl (N/m) | 940 FasCal clear/ vinyl (N/m) | 900 FasCal White/ Vinyl (N/m) | 900 FasCal White (N/m) |
|---|---|---|---|---|
| Example 93 | 1973 C/tear | 1048 FF | 450 C | 651 FF |
| Example 94 | 1024 P | 1073 M | 709 FF | 687 FF |
| Example 95 | 1004 P | 1037 P | 531 FF | 728 FF |
| Example 96 | 937 P | 888 P | 591 C | 559 FF |
| Control C | 1063 C | 793 P | | |
| Control D | | | 598 C | 774 M |

C = Cohesive
P = Panel
M = Mixed failure
FF = Facestock failure

TABLE XVI 9 day UV - Dry @ 50° C.

| Example | 940 FasCal clear vinyl N/m | Rt. Shear, min | 24 hr. H₂O Opacity (%) |
|---|---|---|---|
| Example 93 | 1260, C | 5124, C | 1.15 |
| Example 94 | 958, P | 7850, C | 1.24 |
| Example 95 | 1012, P | 9296, C | 1.11 |
| Example 96 | 899, P | 5241, C | 3.02 |

Battery Applications

As described in U.S. patent application Ser. No. 656,435 filed May 31, 1996 (incorporated herein by reference), PSAs have been proposed for battery labels. The labels are normally monoaxially or biaxially oriented polymeric films decorated with indicia used for the battery. For this application, good mandrel performance is important independent of whether the label ends which extend along the length of the battery case meet in abutting relation or overlapping relation.

The PSA layer may extend over the entire surface of the facestock, only along edges, or extend about the periphery of the label, and be of a width sufficient to ensure sufficient adhesive contact with the battery case or the face of the label.

The PSA must have sufficient shear or cohesive strength to prevent excessive shrink-back of the label where adhered to the battery case upon the action of heat after placement of the label on a battery as the substrate; sufficient peel strength to prevent the facestock from lifting from the battery; and sufficient tack or grab to enable adequate in flight attachment of the label to the battery case during the labeling operation.

In order to have an overall balance of adhesive properties and to enable proper application and retention of label intact on the battery case, it is presently preferred that the adhesive have a peel strength or adhesivity of at least preferably about 350 N/m, more preferably 350 to about 875 N/m, as determined by using PSTC #1 (Pressure-Sensitive Tape Council Test #1) run at 12 inches per minute peel rate after 20 min. dwell on a 2-mil polyester backing; a shear strength, a measure of cohesive strength, of at least 4,000, preferably about 4,000 to about 10,000 min. according to PSTC Test #7 using 2 mil polyester backing, which for a sample measuring 0.5 by 0.5" and a 500 gram weight, results in a loading of 2,000 grams per square inch; and a loop tack of at least about 350, preferably 350 to about 700 N/m at a 12" per minute peel rate for a 1" wide loop on stainless steel.

The pressure-sensitive adhesives of this invention have properties which enable their use for battery label applications.

What is claimed is:

1. Pressure-sensitive adhesive (PSA) copolymers which, when coated and dried as a film, resist water whitening, formed by polymerizing in emulsion a mixture of monomers comprising at least one alkyl acrylate ester of an alcohol containing 4 to 8 carbon atoms, the total amount of alkyl acrylate esters being about 55 to about 85% by weight of the mixture of monomers;

at least one polar comonomer, the total amount of polar comonomers being about 1 to about 10% by weight of the mixture of monomers; and at least one partially water soluble comonomer selected from the group consisting of methyl acrylate, ethyl acrylate, methyl methacrylate, and vinyl acetate, the total amount of partially water soluble comonomers being about 8 to about 25% by weight of the mixture of monomers;

polymerization being carried out in an aqueous media in the presence of at least one nonionic surfactant containing at least 8 moles of ethylene oxide per mole of nonionic surfactant and at least one anionic surfactant containing up to 4 moles of ethylene oxide per mole anionic surfactant, wherein the weight ratio of nonionic surfactant to anionic surfactant is at least 1.5:1;

said emulsion thereafter neutralized by the addition of at least one base to a pH greater than 7;

said copolymers, when cast as a film on a clear, 2 mil thick, biaxially oriented polypropylene film at a coat weight of 20 to 22 g/m², dried, and immersed in water of at least 95° C. for 10 minutes, and then laminated to a clear, 2 mil thick polyester film, having an opacity of about 5% or less as determined with a spectrocolorimeter.

2. Copolymers as claimed in claim 1, wherein the pH of the emulsion is from about 7.2 to about 9.

3. Copolymers as claimed in claim 1, wherein the pH of the emulsion is from about 7.5 to about 8.

4. Copolymers as claimed in claim 1, wherein said at least one polar comonomer is a carboxylic acid containing 3 to 5 carbon atoms.

5. Copolymers as claimed in claim 1, wherein said at least one polar comonomer is selected from the group consisting of acrylic acid, methacrylic acid, fumaric acid, and itaconic acid.

6. Copolymers as claimed in claim 1, wherein said at least one polar comonomer consists essentially of acrylic acid or a mixture of acrylic acid and methacrylic acid.

7. Copolymers as claimed in claim 1, wherein said at least one partially water soluble comonomer consists essentially of methyl acrylate, methyl methacrylate, or a mixture thereof.

8. Copolymers as claimed in claim 1, wherein the weight ratio of nonionic surfactant to anionic surfactant is 1.5:1 to about 6:1.

9. Copolymers as claimed in claim 1, wherein the weight ratio of nonionic surfactant to anionic surfactant is 1.5:1 to about 4:1.

10. Copolymers as claimed in claim 1, wherein the base is ammonium hydroxide.

11. Copolymers as claimed in claim 1, modified by adding to said emulsion following polymerization of said mixture of monomers at least one electrolyte in an amount sufficient to stabilize pressure-sensitive adhesive films formed from said copolymer against an increase in opacity with time.

12. Copolymers as claimed in claim 11, wherein the total weight of added electrolyte(s) is about 0.01 to about 0.25% by weight of the emulsion.

13. Copolymers as claimed in claim 11, wherein the total weight of added electrolyte(s) is about 0.03 to about 0.1% by weight of the emulsion.

14. Copolymers as claimed in claim 11, wherein said at least one electrolyte is selected from the group consisting of alkali metal sulfates, alkali earth metal sulfates, alkali metal acetates, alkali earth metal acetates, alkali metal phosphates, and alkali earth metal phosphates.

15. Copolymers as claimed in claim 14, wherein the alkali metal is sodium.

16. Copolymers as claimed in claim 1, wherein the at least one alkyl acrylate ester consists essentially of butyl acrylate, 2-ethylhexyl acrylate, or a mixture thereof.

17. PSA copolymers which, when coated and dried as a film, are clear and resist water whitening, formed by copolymerizing in emulsion a mixture of monomers comprising at least one alkyl acrylate ester of an alcohol containing at 4 to 10 carbon atoms, the total amount of alkyl acrylate esters being about 55 to about 90% by weight of the mixture of monomers;

at least one polar comonomer, the total amount of polar comonomers being about 1 to about 10% by weight of the mixture of monomers; and at least one partially water soluble comonomer selected from the group consisting of methyl acrylate, ethyl acrylate, methyl methacrylate, and vinyl acetate, the total amount of partially water soluble comonomers being about 8 to about 25% by weight of the mixture of monomers;

said copolymers formed as particles having a volume average particle diameter up to about 210 nm as determined by laser light scattering, said mixture of monomers being emulsion polymerized in the presence of at least one nonionic surfactant containing at least about 8 moles of ethylene oxide per mole nonionic surfactant and at least one anionic surfactant containing ethylene oxide in an amount up to about 4 moles per mole anionic surfactant, wherein the weight ratio of nonionic surfactant to anionic surfactant is at least 1.5:1, said emulsion thereafter neutralized by the addition of at least one base to a pH greater than 7, said copolymers, when cast as a film on a clear, 2 mil thick, biaxially oriented polypropylene film at a coat weight of 20 to 22 g/m$^2$, dried, and immersed in water of at least 95° C. for 10 minutes, and then laminated to a clear, 2 mil thick polyester film, having an opacity of about 5% or less as determined with a spectrocolorimeter.

18. Pressure-sensitive adhesive (PSA) copolymers which, when coated and dried as a film, resist water whitening, formed by polymerizing in emulsion a mixture of monomers comprising butyl acrylate, 2-ethylhexyl acrylate, or a mixture thereof, in a total amount of about 55 to about 85% by weight of the mixture of monomers;

at least one polar comonomer, the total amount of polar comonomers being about 1 to about 10% by weight of the mixture of monomers; and at least one partially water soluble comonomer selected from the group consisting of methyl acrylate, ethyl acrylate, methyl methacrylate, and vinyl acetate, the total amount of partially water soluble comonomers being about 8 to about 25% by weight of the mixture of monomers;

polymerization being carried out in an aqueous media in the presence of at least one nonionic surfactant containing at least 8 moles of ethylene oxide per mole nonionic surfactant and at least one anionic surfactant containing up to 4 moles ethylene oxide per mole anionic surfactant, wherein the weight ratio of nonionic surfactant to anionic surfactant is at least 1.5:1;

said emulsion thereafter neutralized by the addition of at least one base to a pH greater than 7;

said copolymers, when cast as a film on a clear, 2 mil thick, biaxially oriented polypropylene film at a coat weight of 20 to 22 g/m$^2$, dried, and immersed in water of at least 95° C. for 10 minutes, and then laminated to a clear, 2 mil thick polyester film, having an opacity of abut 5% or less as determined with a spectrocolorimeter.

19. A process for making pressure-sensitive adhesives (PSAs) which, when coated and dried as a film are clear and resist water whitening, comprising:

(a) copolymerizing in emulsion a mixture of monomers comprising at least one alkyl acrylate ester of an alcohol containing 4 to 8 carbon atoms, the total amount of alkyl acrylate esters being about 55 to about 85% by weight of the mixture of monomers, at least one polar comonomer, the total amount of polar comonomers being about 1 to about 10% by weight of the mixture of monomers, and at least one partially water soluble comonomer selected from the group consisting of methyl acrylate, ethyl acrylate, methyl methacrylate, and vinyl acetate, the total amount of partially water soluble comonomers being about 8 to about 25% by weight of the mixture of monomers, polymerization being carried out in the presence of at least one nonionic surfactant containing at least about 8 moles of ethylene oxide per mole nonionic surfactant and at least one anionic surfactant containing up to about 4 moles ethylene oxide per mole anionic surfactant, wherein the nonionic surfactant to anionic surfactant weight ratio is at least 1.5:1; and (b) adding to the product of polymerization at least one base to neutralize the emulsion to a pH greater than 7;

said PSAs, when cast as a film on a clear, 2 mil thick, biaxially oriented polypropylene film at a coat weight of 20 to 22 g/m$^2$, dried, and immersed in water of at least 95° C. for 10 minutes, and then laminated to a clear, 2 mil thick polyester film, having an opacity of about 5% or less as determined with a spectrocolorimeter.

20. A process as claimed in claim 19, wherein the pH is from about 7.2 to about 9.

21. A process as claimed in claim 19, wherein the pH is from about 7.5 to about 8.

22. A process as claimed in claim 19, wherein said at least one polar comonomer is a carboxylic acid containing 3 to 5 carbon atoms.

23. A process as claimed in claim 19, wherein said at least one polar comonomer is selected from the group consisting of acrylic acid, methacrylic acid, fumaric acid, and itaconic acid.

24. A process as claimed in claim 19, wherein the polar comonomer consists essentially of acrylic acid or a mixture of acrylic acid and methacrylic acid.

25. A process as claimed in claim 19, wherein the weight ratio of nonionic surfactant to anionic surfactant is about 1.5:1 to 6:1.

26. A process as claimed in claim 19, wherein the base is ammonium hydroxide.

27. A process as claimed in claim 19, further including the step of adding to said emulsion following polymerization of said mixture of monomers at least one electrolyte in an amount sufficient to stabilize pressure-sensitive adhesive films cast from said emulsion against significant increased in opacity with time.

28. A process as claimed in claim 27, wherein the total weight of added electrolyte(s) is about 0.01 to about 0.25% by weight of the emulsion.

29. A process as claimed in claim 27, wherein the total weight of added electrolyte(s) is about 0.03 to about 0.1% by weight of the emulsion.

30. A process as claimed in claim 27, wherein the electrolyte is selected from the group consisting of alkali metal sulfates, alkali earth metal sulfates, alkali metal acetates, alkali earth metal acetates, alkali metal phosphates, and alkali earth metal phosphates.

31. A process as claimed in claim 30, wherein the alkali metal is sodium.

32. A process for producing clear pressure-sensitive adhesives (PSAs), comprising:

(a) copolymerizing a mixture of monomers comprised of at least one alkyl acrylate ester of an alcohol containing 4 to 10 carbon atoms, present in an amount of from about 50 to about 90% by weight based on the total weight of the monomer mixture, at least one polar comonomer present in an amount of at least 1% by weight of the monomer mixture, and at least one partially water soluble comonomer selected from the group consisting of methyl acrylate, ethyl acrylate, methyl methacrylate, and vinyl acetate, present in an amount of at least about 7% by weight of total monomers, said mixture of monomers being dispersed in an aqueous polymerization media and copolymerized in the presence of at least one nonionic surfactant containing at least about 8 moles of ethylene oxide per mole nonionic surfactant and at least one anionic surfactant containing ethylene oxide in an amount up to about 4 moles per mole anionic surfactant, at a weight ratio of nonionic surfactant to anionic surfactant of at least 1.5:1; and (b) adding to the product of polymerization at least one base to produce an emulsion having a pH greater than 7 and containing particles having a volume average particle diameter up to about 210 nm as determined by laser light scattering;

said PSAs, when cast as a film on a clear, 2 mil thick, biaxially oriented polypropylene film at a coat weight of 20 to 22 g/m$^2$, dried, and immersed in water of at least 95° C. for 10 minutes, and then laminated to a clear, 2 mil thick polyester film, having an opacity of about 5% or less as determined with a spectrocolorimeter.

33. A process as claimed in claim 32, further comprising the step of adding to said emulsion following polymerization of said mixture of monomers at least one electrolyte provided in an amount sufficient to stabilize opacity of a pressure sensitive adhesive film cast from said emulsion.

* * * * *